United States Patent [19]

Thayer, III

[11] Patent Number: 5,658,535
[45] Date of Patent: Aug. 19, 1997

[54] TRANSVERSE FLOW UNIFORM DROPLET $O_2(^1\Delta)$ GENERATOR AND METHOD FOR ITS USE

[75] Inventor: William J. Thayer, III, Kent, Wash.

[73] Assignee: STI Optronics Corporation, Bellevue, Wash.

[21] Appl. No.: 502,515

[22] Filed: Jul. 14, 1995

[51] Int. Cl.⁶ ............................................. B01J 10/00
[52] U.S. Cl. .................. 422/129; 422/224; 422/228; 422/234; 423/579; 261/118; 239/102.2
[58] Field of Search ........................ 422/129, 224, 422/228, 234, 127, 128; 423/579; 261/118; 239/102.2

[56] References Cited

U.S. PATENT DOCUMENTS

| | | | |
|---|---|---|---|
| 4,318,895 | 3/1982 | Richardson et al. | 423/579 |
| 4,342,116 | 7/1982 | MacKnight et al. | 372/89 |
| 4,461,756 | 7/1984 | Rockenfeller | 423/579 |
| 4,558,451 | 12/1985 | McDermott et al. | 372/89 |
| 4,640,782 | 2/1987 | Burleson | 210/748 |
| 4,668,498 | 5/1987 | Davis | 423/579 |
| 4,975,265 | 12/1990 | Hed | 423/579 |
| 5,229,100 | 7/1993 | Harpole | 423/579 |
| 5,246,673 | 9/1993 | Hed | 422/224 |
| 5,392,988 | 2/1995 | Thayer, III | 239/102.2 |
| 5,417,928 | 5/1995 | McDermott | 422/120 |

*Primary Examiner*—Nina Bhat
*Attorney, Agent, or Firm*—Robert M. Storwick

[57] ABSTRACT

A transverse flow uniform droplet generator and method for its use. The droplet generator, such as is used with a gas laser system, produces singlet oxygen from a flow of droplets of liquid basic hydrogen peroxide (BHP) reacting with a transverse a flow of $He/Cl_2$ gas mixture. The resulting flow of singlet oxygen travels in the same direction as the $He/Cl_2$ gas mixture and the unreacted BHP is collected on the opposite of the reaction volume from which it enters. Very uniformly-size BEP droplets are formed by an injector which specific mechanical resonance characteristics and the flow of the BHP and the gas mixture in the generator volume is also carefully controlled.

18 Claims, 6 Drawing Sheets

TRANSVERSE FLOW UNIFORM DROPLET $O_2(^1\Delta)$ GENERATOR AND METHOD FOR ITS USE

GOVERBNMENT RIGHTS

This invention was made with Government support under Contract No. F29601-88-C-0019 awarded by the Department of the Air Force.

TECHNICAL FIELD

The present invention relates to apparatus for promoting a chemical reaction and, more particularly, to apparatus for promoting a chemical reaction to generate a chemical species for use in a laser system.

BACKGROUND OF THE INVENTION

The distribution of droplet sizes in a conventional reactive spray system causes both over- and under-reaction on the small and large droplets respectively. Analysis and experiments show that relatively large droplets (on the order of 0.5 mm diameter) are nearly optimal for the generation of singlet oxygen for use in a laser system. Relatively large droplets of a single diameter are deflected only a limited distance by a gas flow in the spray system reactive volume, eliminating carryover of liquid reactant into the output stream of the singlet oxygen. The small droplets in a conventional spray system are subject to massive carryover in a transverse flow system due to their low mass and relatively high frictional drag. Accordingly, it is desirable to have a spray reactive system that is capable of producing relatively large, highly uniform, droplets.

SUMMARY OF THE INVENTION

According to one aspect, the invention is an apparatus to promote a chemical reaction between a chlorine-bearing gas stream and a liquid basic hydrogen peroxide stream. The apparatus comprises a flow device and an injector. The flow device produces a continuous substantially linear flow of the chlorine-bearing gas stream. The substantially linear flow of the chlorine-bearing gas stream is directed in a first direction through a chemical reaction volume. The injector generates a discrete substantially linear flow of the liquid basic hydrogen peroxide stream. The substantially linear flow of the liquid basic hydrogen peroxide stream occurs in a second direction that is substantially perpendicular to the first direction and directed through the chemical reaction volume. As a result thereof, the chlorine-bearing gas stream and the liquid basic hydrogen peroxide stream react chemically to produce a substantially linear flow of singlet oxygen.

According to a second aspect, the present invention is an apparatus to promote a chemical reaction between a gas of a chlorine-bearing gas stream and a liquid of a liquid basic hydrogen peroxide stream. The apparatus comprises a flow device and an injector. The flow device produces a continuous substantially linear flow of the gas directed in a first direction through a gas inlet of a chemical reaction volume to a gas outlet of the chemical reaction volume. The injector generates a substantially linear flow of droplets of the liquid in a second direction that is substantially perpendicular to the first direction and directed through the chemical reaction volume. As a result thereof, the chlorine-bearing gas stream and the liquid basic hydrogen peroxide stream react chemically to produce a substantially linear flow of singlet oxygen.

According to a still further aspect, the invention is a method for promoting a chemical reaction between a chlorine-bearing gas stream and a liquid basic hydrogen peroxide stream. The method comprises the steps of a) producing a continuous substantially linear flow of the chlorine-bearing gas stream and b) generating a discrete substantially linear flow of the liquid basic hydrogen peroxide stream. The substantially linear flow of the chlorine-bearing gas stream is directed in a first direction through a chemical reaction volume and the substantially linear flow of the liquid basic hydrogen peroxide stream occurs in a second direction that is substantially perpendicular to the first direction and directed through the chemical reaction volume. As a result thereof, the chlorine-bearing gas stream and the liquid basic hydrogen peroxide stream react chemically to produce a substantially linear flow of singlet oxygen.

DETAILED DESCRIPTION OF THE PREFERRED EMBODIMENT OF THE INVENTION

This patent application is being filed concurrently (under Express Mail certificate EG952525697US, on Jul. 14, 1995) with another patent application entitled "METHOD AND APPARATUS FOR PROMOTING A CHEMICAL REACTION," on an invention by the inventor of the inventions described in the present patent application. That concurrently-filed patent application is hereby incorporated by reference.

The exemplary TUDOG configuration is described below. In this preferred embodiment of the transverse flow uniform droplet chemical reactor, the continuous fluid was a gas phase mixture of helium, chlorine, and electronically excited oxygen which was produced when this gas reacted with uniformly sized droplets of basic hydrogen peroxide.

The preferred embodiment of the transverse flow uniform droplet $O_2(^1\Delta)$ generator (TUDOG) has been developed to operate using most of the components of a coflowing uniform droplet $O_2(^1\Delta)$ generator (UDOG) test apparatus. Due to the change in flow geometry from coflowing to transverse flow (which will be described subsequently), this preferred embodiment required gas and liquid inlet and outlet lines to be configured to supply fluids to the chemical reactor. Several changes were made to gas supplies and control systems to allow handling of increased gas flow rates.

The exemplary TUDOG was designed to operate like a segment of a chemical reactor gas generator for chemical oxygen iodine laser (COIL). This chemical reactor was designed and fabricated to meet operating requirements of an existing laser, and some of the specific dimensions given are associated with this requirement. It will be understood, however, that other chemical reactors could also be made to operate in accordance with the principles of the invention, of which only one possible exemplary embodiment is disclosed in the following.

Figure 1:
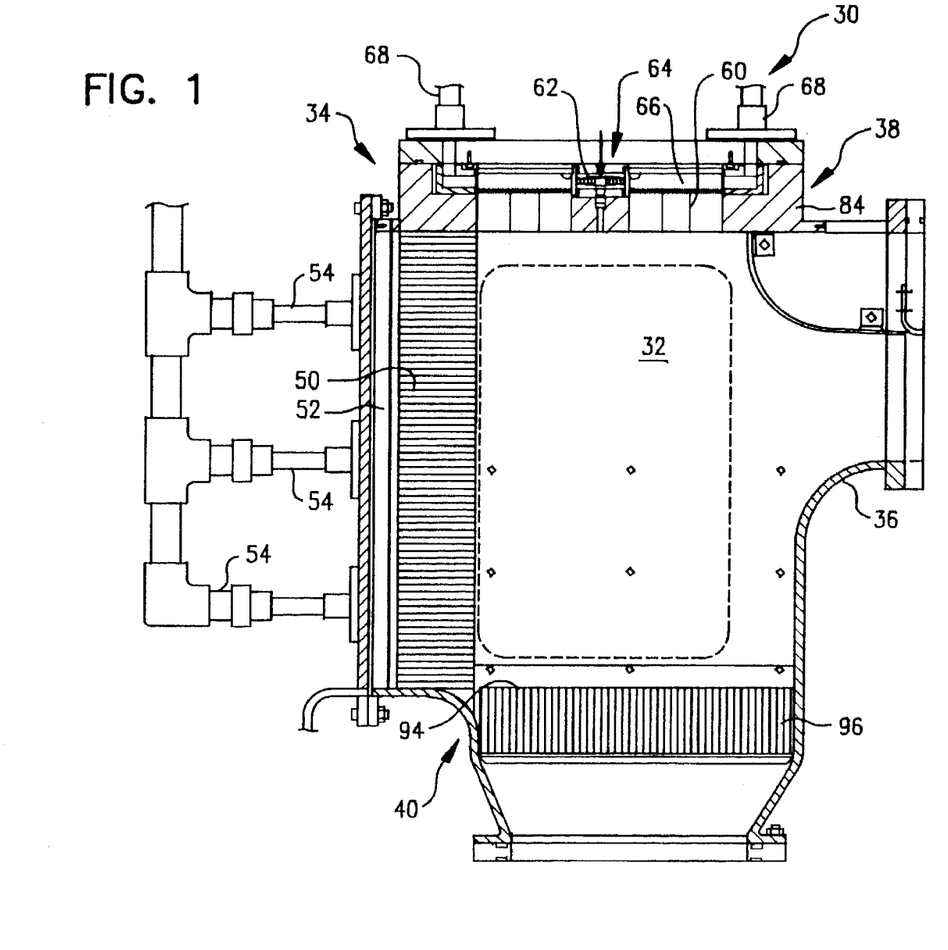
FIG. 1 is a cross-sectional side view of the preferred embodiment of the invention.
Figure 2:
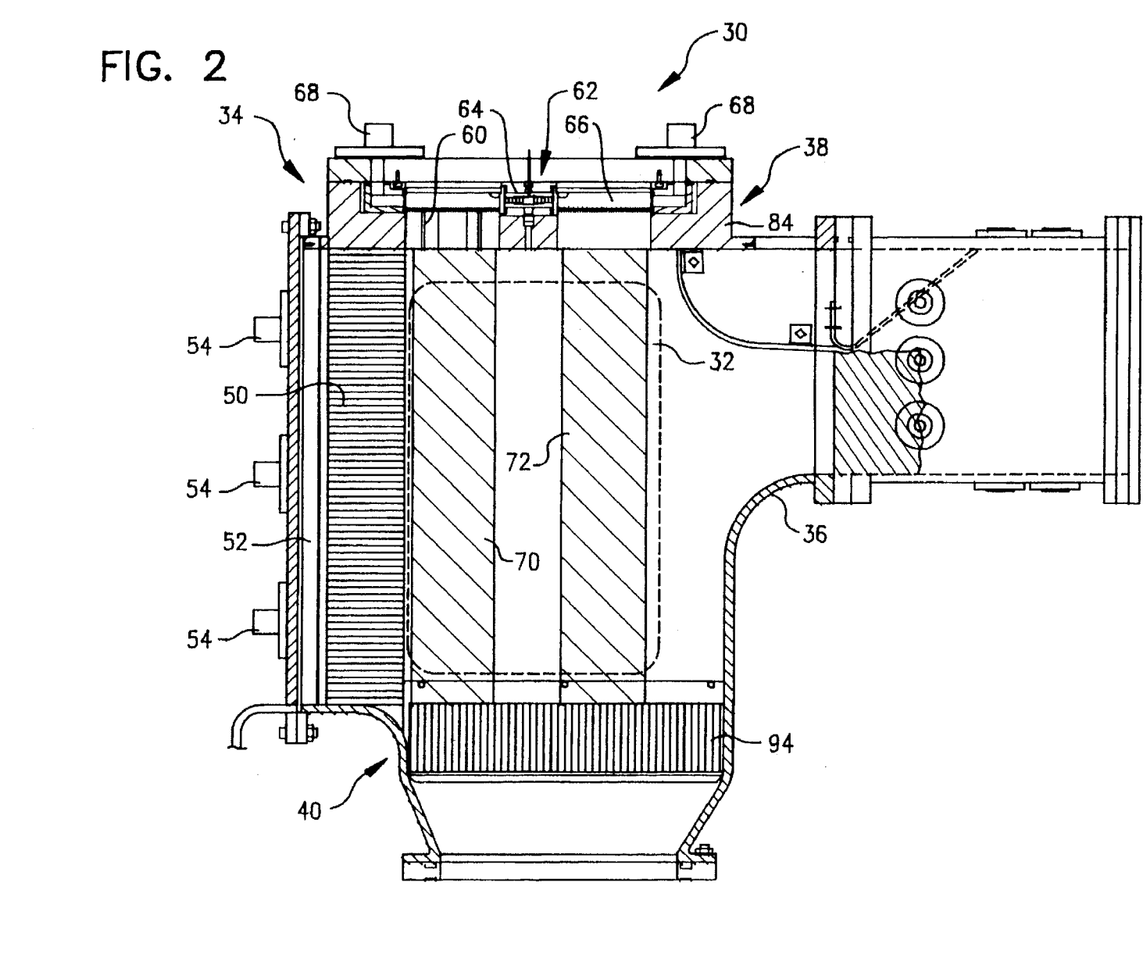
FIG. 2 is a close-up view of the cross-sectional side view of FIG. 1.

FIG. 1 is a cross-sectional side view of the preferred embodiment of the invention and FIG. 2 is a close-up view of the cross-sectional side view of FIG. 1.

The transverse flow geometry of the invention makes the dimensions or flow cross sections for the two chemically reactive fluids independent. This makes it possible to independently control the fluid velocity and residence time of each fluid in the chemical reactor volume 32 (see FIG. 1), and thus control the extent of reaction of each fluid independently. This can strongly affect the output of the generator 30, providing superior chemical yields. The specific surface area of the droplets and residence time of the fluids in the chemical reactor volume 32 control the overall rate and extent or completeness of the chemical reaction. The specific surface area of droplets, i.e. the surface area of droplets per unit volume of reactor, is controlled by the spacing and size of the droplets. The spacing and size of the droplets can be controlled by the spacing of injector orifices (to be described subsequently) and the frequency of the disturbance that generates the uniform droplets. The residence time of each fluid is controlled by the mean velocity of that fluid and the length of the chemical reactor volume 32 through which the fluid passes. Since the dimension of the chemical reactor volume 32 in the droplet and continuous stream flow directions can be chosen independently, the residence times can be controlled independently. For example, the width of the exemplary TUDOG chemical reactor volume 32 was ~18 cm in the gas flow direction and 52 cm in the droplet flow direction, with a width of ~10 cm. This is not possible in co-flow, counter-flow, or other chemical reactor geometries, where the reactor length is the same for each fluid.

The transverse flow geometry also makes possible independent configurations for the inlet and outlet flow geometries for each fluid. Generation of uniformly sized droplets at a high frequency requires special flow and mechanical configurations, including fluid distribution manifolds, injector nozzle geometries, sizes and spacings, rigid vibrational structures, and actuator devices to cause regular liquid jet breakup. Distribution of the continuous fluid stream over the cross section of the generator 30 also requires specialized configurations, including flow distributors and straighteners. In efficient coflow or counterflow reactors, these two functions have to be located in the same flow cross section, and the geometry of the means for each function must be compromised by the requirements of the other function. These compromises of configuration are avoided in the transverse flow chemical reactor, where two fluids enter and leave the reactor on four separate faces. This allows the distribution of the reactive streams to be chosen to optimize the reactor performance rather than to be dominated by some secondary function.

The preferred embodiment of the invention was designed to fit on top of a UDOG droplet collector, which serves as a storage reservoir for the liquid reactant (preferably a basic hydrogen peroxide (BHP) solution) during each test. The transverse flow uniform droplet oxygen generator 30 of the present invention (see FIGS. 1 and 2) includes a chemical reactor volume 32, a gas flow source 34, a gas flow nozzle 36, a droplet source 38 and a condensor/recycler 40. The chemical reactor volume 32 is surrounded on two opposing sides by the gas flow source 34 and the gas flow nozzle 36 and on two further opposing sides by the droplet source 38 and the condensor/recycler 40. The chemical reactor volume 32 is bounded on two further opposing sides (substantially perpendicular to the previously-mentioned pairs of sides) which are parallel to the plane of FIG. 1, and not shown in FIG. 1.

The gas flow source 34 includes a gas inlet/flow straightener 50 and a manifold 52 which is fed a He/Cl$_2$ gas mixture through a plurality of pipes 54. The plurality of pipes 54 are connected to a supply of the He/Cl$_2$ gas mixture. The He/Cl$_2$ gas mixture passes through the plurality of pipes 54 to the manifold 52. The He/Cl$_2$ gas mixture in the manifold 52 then passes through the gas inlet/flow straightener 50 into the reactor volume 32.

The droplet source 38 includes a plurality of gas flow baffles 60, a droplet injector 62, an injector actuator 64 and a BHP manifold 66. The BHP manifold 66 is connected to a supply of BHP through a plurality of BHP inlets 68 that receive pipes carrying the BHP. The BHP entering the BHP manifold 66 then passes through the droplet injector 62 which is actuated by the injector actuator 64, which will both be described in greater detail subsequently. After passage through the droplet injector 62, droplets of the BHP enter the chemical reactor volume 32.

Figure 3:
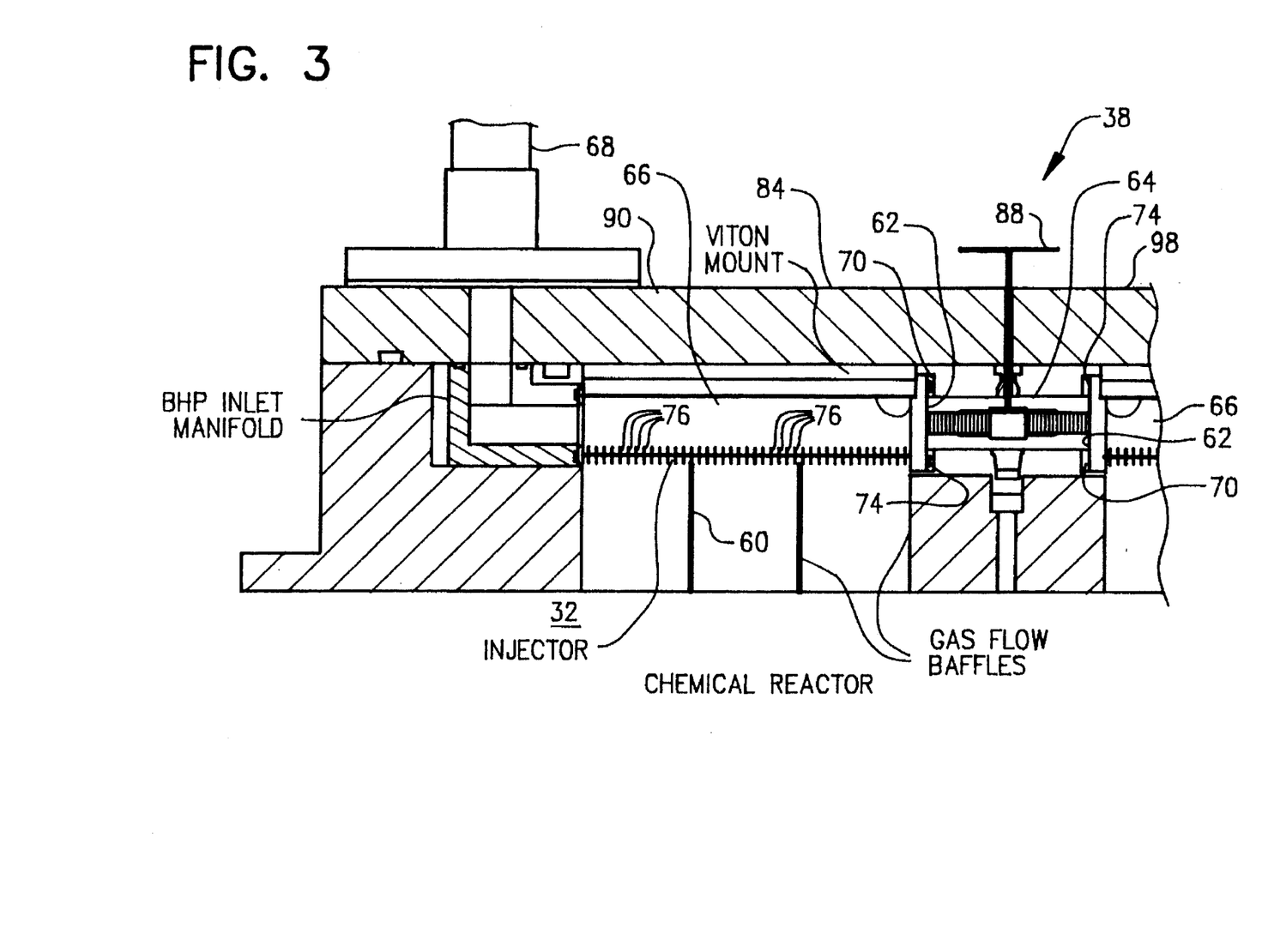
FIG. 3 is a side view of injector, inlet manifold and actuator assemblies of the preferred embodiment of the invention.

FIG. 3 is a side view of injector, inlet manifold and actuator assemblies of the preferred embodiment of the invention. The gas flow nozzle 36 is designed to flow into a UDOG diagnostic duct (not shown) where conventional optical diagnostic devices were installed to measure the output of $O_2(^1\Delta)$, $O_2(^1\Sigma)$, water vapor, and residual Cl$_2$ in the gas flow nozzle 36. Droplets of the BHP are injected from the top and fall through the chemical reactor volume 32 from the droplet source 38 (injector) to the condensor/recycler 40 (collector) located below the chemical reactor volume 32. The Cl$_2$ and He mixture enter through the manifold 52 and flow distributor (gas inlet/flow straightener 50), pass through the droplet field indicated by cross hatching (in FIG. 2), and leaves the generator 30 through the gas flow nozzle 36. Table 1 lists some of the design and flow parameters of the preferred embodiment.

TABLE 1

The exemplary TUDOG configuration and operating conditions.

| Configuration | | Operating Conditions |
|---|---|---|
| Reactor Height | H$_r$ | 52.5 cm (39.4, 26.3 cm) |
| Reactor Length | L$_r$ | 17.6 or 8.8 cm |
| Reactor Width | W$_r$ | 9.9 cm |
| Number of Orifices | N$_o$ | 5220 |
| Orifice Diameter | D$_o$ | 0.0165 cm |
| Vibration Frequency | fv | 4000 Hz |
| Gas Inlet Temperature | T$_{gi}$ | 300 K |
| Gas Inlet Pressure | P | 4–13 kPa |
| He/Cl$_2$ Ratio | RN | 2.5–20.0 |
| Cl$_2$ Flow Rate | N$_{cli}$ | 0.06–0.50 mole/s |
| Inlet Gas Velocity | U$_{gi}$ | 500–2000 cm/s |
| Droplet Velocity | U$_{do}$ | 400–1400 cm/s |
| Droplet Diameter | D$_d$ | 0.4–0.5 mm |
| BHP Flow Rate (Baseline) | V$_{bhp}$ | 700 cm$^3$/s |

FIG. 2 also shows the volumes 70 and 72 of the chemical reactor volume 32 in which the chemical reactions take place and various other flow regions of the generator up to the location of the $O_2(^1\Delta)$ and $O_2(^1\Sigma)$ diagnostic ports. An embodiment of the exemplary TUDOG was built with large side windows (not shown), located parallel to the plane of FIGS. 1 and 2, to allow observation of the droplet/gas flow field inside the chemically reacting zone. The reactor was built with two zones of droplet/gas flow to accommodate the injector design.

The uniform droplets and the transverse flow of the gas relative to the droplets are very important in making the exemplary TUDOG perform as well as it does relative to other chemical reactors. The use of uniformly sized droplets in the chemical reactor volume 32 provides a very well controlled surface for chemical reactions. The droplets can easily be spaced at relatively constant distances from each other both vertically (by means of the droplet generation process) and laterally (via orifice spacing). This makes possible the generation of a homogeneous field of virtually constant diameter droplets, upon which chemical reaction can take place at a prescribed rate.

Uniformly sized, large droplets make the transverse flow oxygen generator viable and practical. The uniform droplets and gas streams can be separated from each other quickly and completely when the chemical reaction has reached the desired level of completeness. The gas and droplets can move at relatively high velocities relative to each other and to the reactor. Thus, relatively high specific surface area for chemical reaction and short, very well controlled residence times, ~100 msec or less, of gas and liquid can be simultaneously achieved for all of the liquid and all of the gas. This allows the rate and extent of reaction to be controlled and limited to provide optimum performance.

The average residence times of liquid and gas in the more conventional bubble column and rotating disk reactors are at least ten times longer, and lead to local variations in the chemical reactions which significantly lower those reactors' performance. The transverse flow geometry of the present invention concentrates the chemical reaction on the droplet streams near the gas flow source 34, leaving the droplet field near the gas flow nozzle 36 relatively unaffected by chemical reaction. This leaves a relatively cool, fresh reactant surface near the gas flow nozzle 36 which can efficiently complete the reaction, and cool droplets which cool the gas stream, thus removing water (or other undesired species that have entered the gas stream) from the droplets in the intense reaction region. The transverse flow of the present invention provides a variable field of droplets which has properties that beneficially affect the primary reaction, remove heat and gas species, and aids the disengagement of the two fluids.

The exemplary TUDOG was designed to allow several variations in the geometry of the reactor. The collector location could be changed in two steps to reduce the reactor height from 52.5 cm to 39.4 or 26.3 cm. These locations are indicated by the two sets of three circles above the collector in FIG. 1. Modifications to the He/Cl$_2$ flow distributor and locking plates are needed to prevent Cl$_2$ flow below the collector in these alternate locations. This allows higher gas flux through the reduced area. The He and Cl$_2$ gas supplies can be changed to match the flow metering and supply pressures to reduced flow area requirements at the flow distributor plate. An exemplary alternate way to modify the generator geometry is to reduce the BHP inlet flow area. This can be done by blocking the BHP inlet to either half of the droplet source 38, thus halving the reactor length in the gas flow direction. The gas flow uniformity through the exemplary TUDOG is reduced under these operating conditions since the exemplary TUDOG reactor was designed for two-phase flow through the entire droplet source 38. This was done during several tests and required no other modifications to the test apparatus.

The BHP was supplied to the droplet injector 62 through the two halves of the BHP manifold 66 located at each end of the droplet injector 62 and injector actuator 64 (FIGS. 2 and 3). A narrow gap 70 was left between each half of the BHP manifold 66 and the two halves of the droplet injector 62 to allow for the vibrational motion of the droplet injector 62. These gaps 70 were sealed by low temperature Viton O-rings 74. The low temperature operating limit of these O-rings 74 is expected to be approximately −35° C., below which the elastomer is expected to become too stiff either to provide a seal or to allow unrestricted vibrational motion.

Figure 4:
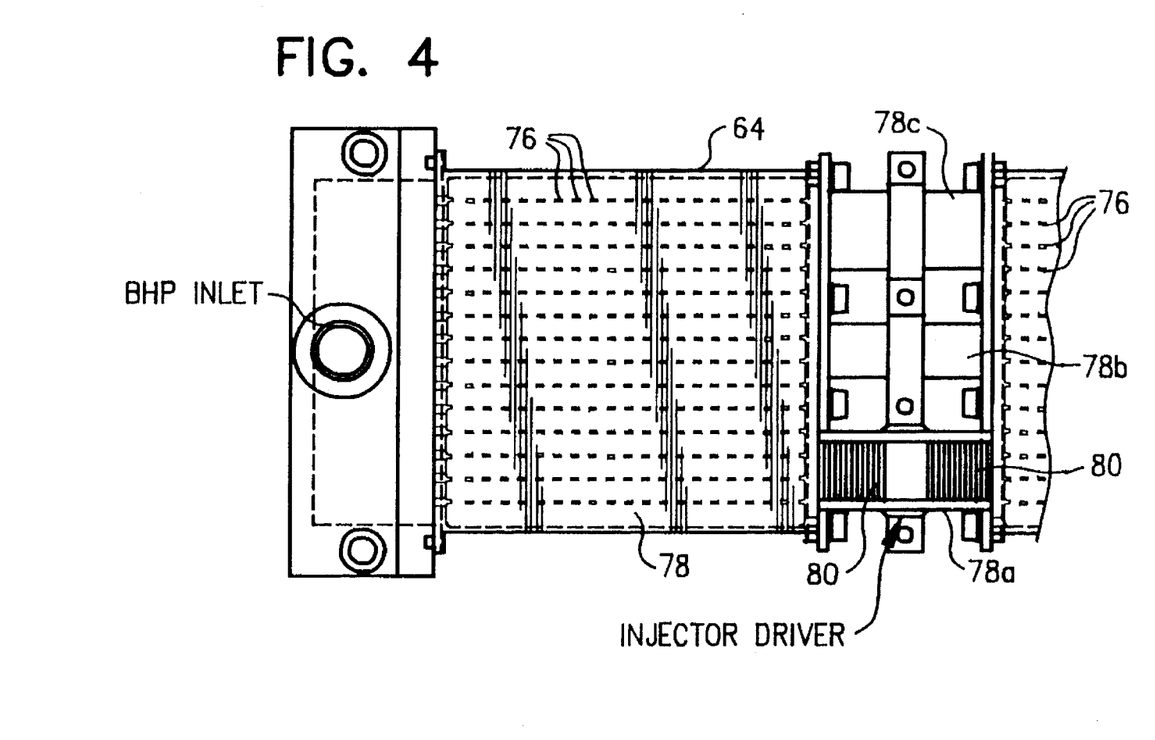
FIG. 4 is a top view of the injector assembly of the preferred embodiment of the invention.

FIG. 4 is a top view of the injector assembly of the preferred embodiment of the invention. The BHP flows through parallel flow passages in the injector to the orifices 76, then through the orifices 76 in the injector face 78 into the chemical reactor volume 32. The injector orifices are approximately 0.0065 inches in diameter. The orifice diameters and the supply pressure of the BHP in the BHP inlet 68 controls the BHP flow rate.

The exemplary uniform droplet injector 62 was built in two halves, primarily to make the motion of each half more uniform. This was expected to maximize the probability of uniformly sized droplets. The droplet injector 62 and injector actuator 64 are shown in FIGS. 3 and 4. Finite element structural and vibration modeling of the motion of the injector at the design vibration frequency of 4 kHz indicated that the dynamic stretching/compression of the metal at this frequency could be significant. Longer injectors generally were predicted to have a larger variation in the amplitude of the motion between the portion of the injector nearest the actuator and the end farthest away. In the final exemplary design, each of the two exemplary TUDOG injector halves was predicted to have motion of all injector orifices that was uniform within ~10 percent. Experience indicates that deviations in the motion of the droplet injector as large as a factor of three to four would be acceptable for low viscosity fluids.

The exemplary injector actuator 64 incorporated three actuators 78a, 78b, and 78c, as shown in FIG. 4. Each actuator consists of two piezoelectric stacks 80, a spacer 82, and conventional springs, flanges, and seals (not shown) to allow for mechanical, electrical, and vacuum connections. The actuator spring stiffness was designed so that the masses of the injector halves would be nearly mechanically resonant, thus minimizing the input power requirement to the piezoelectric stacks 80.

The two injector halves were driven to vibrate in opposite directions, i.e., 180 degrees out of phase by the power conditioning equipment. This minimized the forces transmitted from the injector actuator 64 to the surrounding TUDOG housing 84 (see FIGS. 1–3) and the associated structural requirements. The two opposed piezoelectric stacks 80 in each actuator 78 were supplied with electrical power by a pair of wires 88 that extended through a small passage from the spring through the top flange 90 of the generator 30. The piezoelectric stacks 80 from UDOG were used in the exemplary TUDOG actuators 78. The mechanical connection between the actuators 78 and the injector mounting flange 90 was sealed using standard Viton O-rings.

The exemplary maximum Cl$_2$ flow rate was 0.5 mole/s. The exemplary maximum He flow rate was ~2.5 mole/s. This allowed the flow rate through exemplary TUDOG to be identical to that through a 9.9-cm-wide segment of a projected O$_2$($^1\Delta$) generator for COIL. Control valves (not shown) between the diagnostic duct and a vacuum system were used to control the outlet gas flow rate and chemical reactor pressure.

For best performance, the transverse-flow, uniform droplet chemical reactor has a unique geometry near the outlet for the continuous stream. For optimal reaction completion of both reactive fluids, each needs to flow through the other and be exposed to nominally the same range of relative velocity differences, chemical composition history, and residence time in the reactor. This means that the velocity and molar flux of each fluid be approximately constant across the corresponding flow cross sections of the reactor, ensuring that the rate of mass transport and chemical reactions occur at corresponding locations in the reactor. If this condition is not provided, high molar fluxes in some locations may cause excessive reaction of one reactant and lower the performance of the reactor. Relatively uniform mass fluxes are most easily accomplished if the continuous fluid and the droplets flow in more or less perpendicular paths, and the continuous fluid follows approximately parallel streamlines through the droplet field. However, each fluid transfers momentum to and from the other stream due to viscous forces, and tries to make the other flow parallel rather than perpendicular to it. Thus the droplets are drawn toward the continuous fluid exit and vice versa. This creates pressure gradients between the various regions of the reactor. These pressure gradients can affect flow velocity, both direction and magnitude, within the reactor and in the regions adjacent to the two fluid transverse reacting flow region. For the exemplary TUDOG device, relatively constant velocity profiles were desired for both the droplet and gas reactant streams.

Special inlet and outlet geometries can beneficially affect the flow velocity field of each fluid within the generator. The outlet region of the continuous fluid must be shaped and spaced in specific ways relative to the droplets, depending on the fluid flows and desired output, to maintain a relatively uniform velocity distribution and counteract the entrainment of this stream by the droplets. The exemplary TUDOG reactor was developed to have uniform velocity profiles of droplets and gas in the reaction zone.

The exemplary TUDOG gas outlet geometry is shown in FIGS. 1 and 2, where the gas flow nozzle 36 from the generator has a relatively small flow cross section when compared to the generator and is located closer to the droplet source 38 than the condensor/recycler 40.

Figure 5:
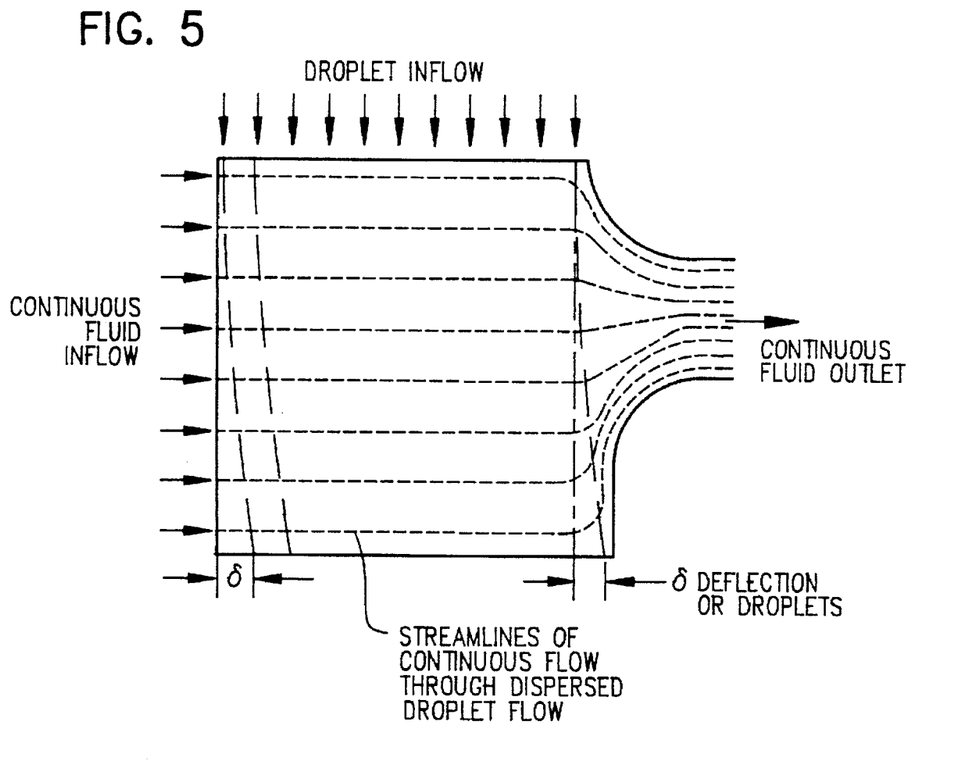
FIG. 5 is a cross-section view of the geometry of the reactor of the preferred embodiment of the present invention.

FIG. 5 is a cross-section view of the geometry of the reactor of the preferred embodiment of the present invention. The almost vertical wall of the reactor above the condensor/recycler 40 was spaced a small, predetermined distance from the disengagement face of the droplets to allow for the gas disengagement and also to control the flow within the droplet field. This asymmetric geometry forces the continuous fluid to flow up the exit face of the droplet field after this fluid disengages from the droplet field. When the flow area for the continuous fluid is limited to a specific size and shape, the effect of entrainment by the droplets can be canceled by the vertical acceleration and pressure field in this area. This forces the continuous fluid to flow across the droplet field as indicated in FIG. 5 rather than flow with the droplets. These effects are especially beneficial when the continuous fluid is a gas which reacts with droplets which are much more dense, as in the exemplary TUDOG reactor. These effects and the specific geometry can be determined through two-dimensional, two fluid flow computer modeling.

Figure 6:
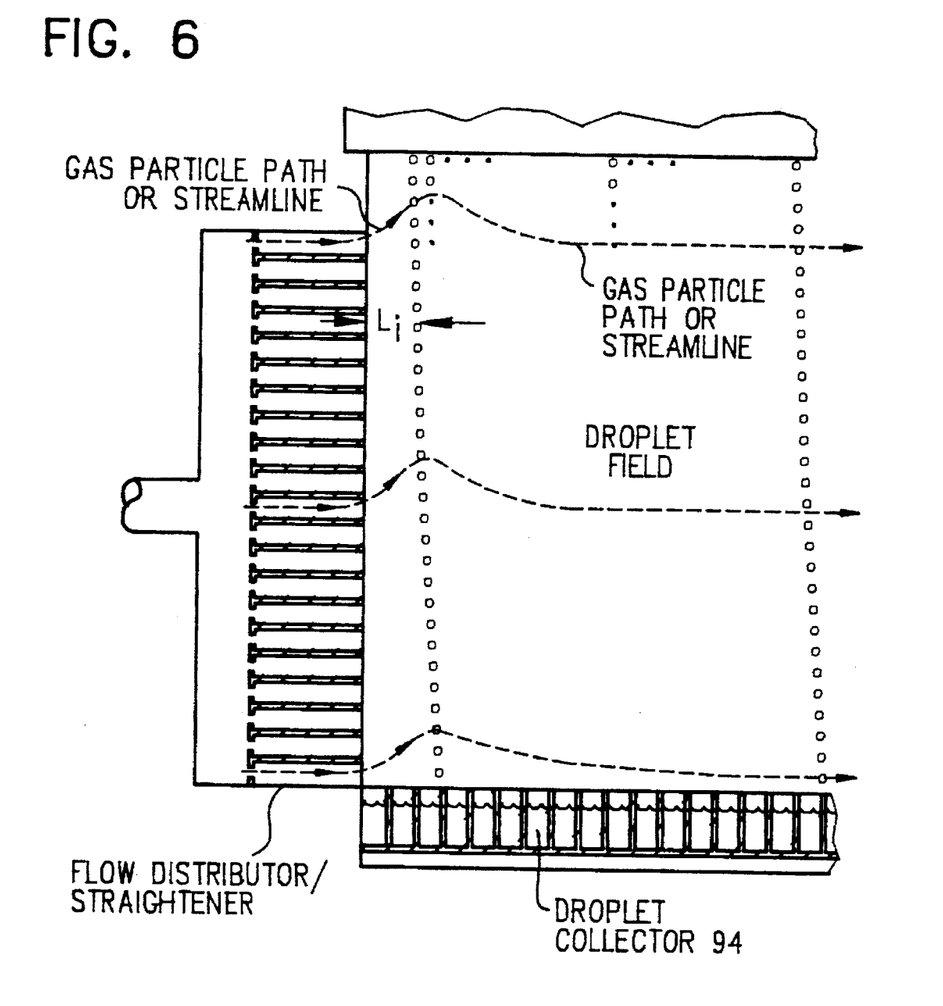
FIG. 6 is a cross-section view of the effect of an incorrect inlet geometry of a reactor of a transverse flow uniform droplet generator.

The continuous fluid flows steadily into the chemically reactive region of transverse droplet flow through the gas inlet/flow straightener 50 so that the molar flux of this reactant is approximately constant and perpendicular to the droplet velocity. The gas inlet/flow straightener 50 causes all parts of the continuous fluid stream to flow in one direction, as indicated in FIG. 5, and also prevent the pressure gradient caused by the droplet flow from changing the desired direction of the continuous fluid flow within the chemical reactor. The droplets cause the pressure at the gas inlet/flow straightener 50 (bottom in FIGS. 1 and 5) to be slightly higher than at the droplet source 38. This pressure difference can cause the continuous fluid to flow upward toward the droplet inlet in the region to the left of the droplet field in FIG. 5, as indicated in FIG. 6. FIG. 6 is a cross-section view of the effect of an incorrect inlet geometry of a reactor of a transverse flow uniform droplet generator. If the gas inlet/flow straighteners 50 are terminated a significant distance from the upstream edge of the droplet field as shown, a significant region of the continuous fluid can occur with a significant velocity toward the droplet inlet. This can cause the chemical reaction to occur more intensely in this region, but it also can slow and change the direction of the droplets in this region, leading to excessive droplet deflections due to momentum transfer, droplet collisions and agglomeration, and other problems. This set of problems can be prevented by having the continuous flow straightener end very close to the edge of the droplet field, that is distance $L_i$ in FIG. 6, be small. The distance that appears to be the smallest practical is approximately the distance between the droplet injector orifices. This small space does not allow sufficient deflections of the continuous stream to cause serious distortion of either the continuous or the droplet streams.

The droplet streams enter the generator 30 from the droplet source 38, FIG. 1. As described above, the droplet source 38 contains a large number of orifices 76 on the face 78 adjacent to the chemical reactor through which liquid passes to form free jets. The droplet injector 62 for the exemplary TUDOG reactor contained ~5200 orifices. This droplet injector 62 is located a short distance from the edge of the chemical reaction zone to prevent the transverse flow from affecting the liquid jet breakup process.

During jet breakup, very thin filaments of liquid can be formed between the droplets. If subjected to the effects of a strong transverse flow of the continuous fluid, these thin liquid jet segments could be torn off the main liquid droplets, causing the formation of large numbers of small to very small droplets relative to the primary droplets. In addition to recessing the liquid injector from the continuous transverse flow, the injector isolation volume is separated into small regions by inserting thin gas flow baffles 60 within these isolation volumes. These gas flow baffles 60 reduce the scale and velocity of the secondary flows to a level that will prevent excessive interference with the uniform droplet formation process. The number of gas flow baffles 60 can be determined from two-dimensional, two-fluid flow computer modeling which determines the magnitude of the secondary flow of continuous fluid within the isolation volume.

The droplet source 38 used in the formation of uniform sized droplets provides a large number of smooth liquid jets with a velocity which is associated with a jet Weber number in the range of approximately 10 to 500. These liquid jets are distributed in a pattern or patterns over the face of the injector to distribute the droplets throughout the chemical reactor. The injector also provides a disturbance to each of the liquid jets, which causes the liquid jet to break up. To form uniformly sized droplets, this disturbance must be primarily a single frequency and have an amplitude sufficiently large to excite breakup. This disturbance can be caused by a source internal to the droplet source 38, in the continuous medium (He/$Cl_2$ gas), or within the structure of the droplet injector 62. Vibration of the droplet injector 62 may be the simplest method for providing this disturbance and was used in the exemplary TUDOG reactor. Moderate to relatively high frequency vibrations of the droplet injector 62, hundreds to thousands of cycles per second, are needed to generate large numbers of uniform droplets which fill the reactor with reasonable numbers of droplets per unit volume.

Piezoelectric, magnetostrictive, or electromagnetic actuators can be used to vibrate the droplet injector 62. These motion sources can be used to input a single frequency disturbance to the droplet injector 62. The droplet injector 62 be appropriately stiff and supported so that structural vibrations of the droplet injector 62 do not occur in modes, directions, and frequencies other than that of the actuator or disturbance source. Piezoelectric actuators were used for the exemplary TUDOG test device.

Figure 7:
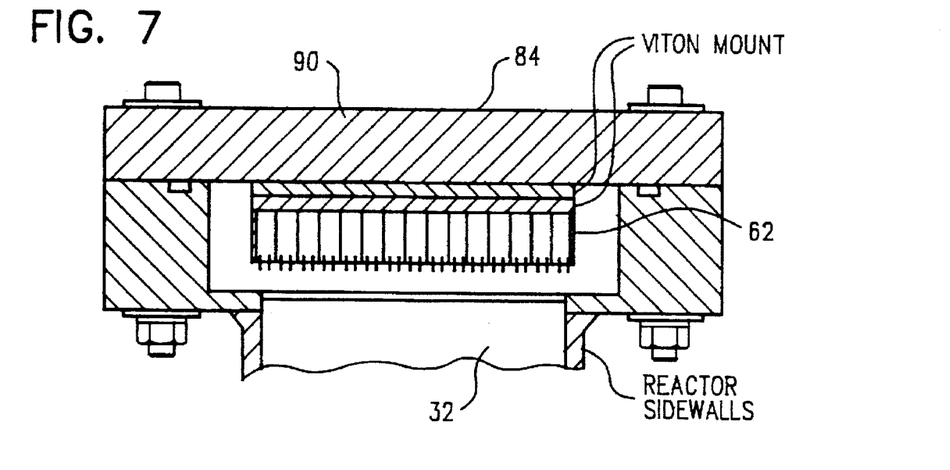
FIG. 7 is a cross-section view of a BHP droplet injector assembly of the preferred embodiment of the invention.

FIG. 7 is a cross-section view of a BHP droplet injector assembly of the preferred embodiment of the invention. FIG. 7 shows an injector configuration which has low mass so that minimum actuator power is required, large internal flow galleries to distribute the droplet liquid evenly to all of the orifices 76, and is structurally rigid so that undesired vibrations do not occur at frequencies up to approximately 6000 Hz. This injector design was used for the exemplary TUDOG. This injector is supported by an elastomer mount which allows vibration in a direction perpendicular to the face of FIG. 9, but not perpendicular to the reactor cover plate on which the injector is mounted. This support has high stiffness to prevent rigid body motion and vibratory or bending modes perpendicular to the desired motion direction, and low stiffness in the direction of motion so that minimum actuator forces and power can be utilized. Alternative injector mount configurations can be made from metallic structures, honeycombs, or other materials to provide high stiffness in directions other than the desired vibratory motion and low stiffness in the direction of vibration.

The injector orifices 76 must have a short flow length in the direction of the liquid jet flow and have smooth, burr free internal surfaces to prevent very small droplets from forming due to turbulence or undesired surface or internal waves within the jets. A long orifice length, $L_o$, relative to the orifice diameter, $D_o$, can cause the liquid flow to have a large shear layer or boundary layer, which could be turbulent. Any of these conditions can cause large numbers of undesirable small, nonuniform droplets to form. If the orifice length to diameter ratio, $L_o/D_o$, is less than approximately four, uniform droplets can be formed for jets in the required Weber number range. This orifice length requirement generally means that the injector face must be thin, which is consistent with the need for low injector mass to minimize actuator requirements.

The side of the chemical reactor 32 where the droplets leave must perform several functions for the transverse flow uniform droplet chemical reactor to operate most efficiently. These functions are: 1) to collect all of the droplets without splashing small droplets into the continuous stream, 2) to allow this fluid to pass continuously from the reactor, and 3) to prevent significant amounts of the continuous fluid from flowing out of the chemical reactor volume 32, into, or bypassing the droplet field at this reactor face. These functions are provided by a droplet collector 94 (see FIGS. 1, 2 and 6), into which droplets flow from one side and out of which a continuous liquid stream flows on the other side. A honeycomb structure 96 made of thin material allows the droplets to pass into the collector 94. If the honeycomb wall thickness is less than approximately one fifth of the droplet diameter, the droplets that collide with the collector walls do not splash or make small droplets which might be entrained by the continuous fluid. The Weber number and the collision angle are sufficiently small that splashing does not occur at conditions for which the uniform droplets can be formed. Honeycomb cell widths less than approximately fifty droplet diameters appear to prevent splashing due to surface waves from occurring to a degree which would cause small droplet entrainment into the continuous fluid. This collector 94 can coalesce the droplets into a continuous liquid stream which can be drained from the chemical reactor 30 and pumped to other points in the chemical process. By draining the droplet liquid at an appropriate rate, this continuous liquid layer can prevent the continuous fluid from flowing through this face of the chemical reactor 30. This type of droplet collector, and face seal to the continuous fluid flow was used in the exemplary TUDOG reactor.

The paired droplet injectors, (see FIGS. 3 and 4) used in exemplary TUDOG with the centrally located actuator minimizes the mechanical coupling between the vibrating parts and the generator structure, thus minimizing the amount of vibration that other parts of the chemical reactor is subjected to. Vibrations and acoustic disturbances that are associated with vibrating mechanical devices can have undesirable effects on other parts of an operating system. The paired configuration essentially decouples the vibrating injectors from the support structure, i.e. the cover plate 98 and the walls of the chemical reactor 30. This in turn will largely eliminate coupling of vibrations from the injector to the laser and other parts to which or in which the reactor is operating.

The paired exemplary TUDOG liquid injectors with an injector actuator 64 were built to be nearly vibrationally resonant at the operating frequency of the droplet generator. The stiffness of the tubular springs, within which the piezoelectric actuators were mounted, was chosen so that the masses of the injectors would have a natural vibration frequency slightly higher than the operating frequency, and to have minimum vibrational energy loss and damping. This near-mechanical resonance minimizes the actuator power required to cause the cyclic disturbance which leads to uniform droplet formation from the liquid jets. This is one of several alternative embodiments of the injector and actuator assembly.

The exemplary TUDOG chemical reactor was built with an electrical drive circuit for piezoelectric actuators 64 which was electrically resonant with the actuator electrical circuit and had minimum losses. The piezoelectric actuators 64 behave primarily as capacitors in the electrical drive circuit. The power conditioning unit of this circuit was designed with an inductance that allowed the drive current to be resonantly transferred between this inductor and the capacitor represented by the piezoelectric stacks as is known by those skilled in the art of electrical circuit design. The electrical charge oscillates back and forth between these inductive and capacitive components, with the small losses made up for by a conventionally-known pulsed charging circuit. This resonantly tuned electrical circuit to drive the actuators for the droplet injectors minimizes the power required to drive the droplet generator. Other conventionally-electrically resonant circuits could be used with similar advantage to drive the breakup of the liquid jets with minimum input power.

While the foregoing is a detailed description of the preferred embodiment of the invention, there are many alternative embodiments of the invention that would occur to those skilled in the art and which are within the scope of the present invention. Accordingly, the present invention is to be determined by the following claims.

I claim:

1. An apparatus to promote a chemical reaction between a chlorine-bearing gas stream and a liquid basic hydrogen peroxide stream, comprising:
   a flow device to produce a continuous substantially linear flow of the chlorine-bearing gas stream, the substantially linear flow of the chlorine-bearing gas stream being directed in a first direction through a chemical reaction volume; and
   an injector to generate a discrete substantially linear flow of the liquid basic hydrogen peroxide stream, the substantially linear flow of the liquid basic hydrogen peroxide stream occurring in a second direction that is substantially perpendicular to the first direction and directed through the chemical reaction volume, whereby the chlorine-bearing gas stream and the liquid basic hydrogen peroxide stream react chemically to produce a substantially linear flow of singlet oxygen.

2. The apparatus of claim 1 wherein the discrete substantially linear flow generated by the injector includes a plurality of droplets of the liquid basic hydrogen peroxide stream, the plurality of droplets having a mean diameter and the standard deviation of the diameters of the plurality of droplets being less than approximately 10 percent of the mean diameter.

3. The apparatus of claim 2 wherein the injector includes a source of the plurality of droplets of the liquid basic hydrogen peroxide stream and a collector of the plurality of droplets of the liquid basic hydrogen peroxide stream, the source and collector of the droplets being located on opposing sides of the chemical reaction volume.

4. The apparatus of claim 3 wherein the source of the plurality of droplets includes a transducer to impart mechanical energy to a first reservoir of the liquid basic hydrogen peroxide stream and a plurality of orifices to form the plurality of droplets of the liquid basic hydrogen peroxide stream, whereby the standard deviation of the plurality of droplets of the second species is less than approximately 0.1 percent of the mean diameter of the plurality of droplets.

5. The apparatus of claim 4 wherein the transducer is a piezoelectric transducer.

6. The apparatus of claim 3 wherein the collector of the plurality of coexisting droplets includes a plurality of narrow baffles substantially aligned with second direction.

7. The apparatus of claim 3 wherein the collector of the plurality of coexisting droplets includes an accumulator to accumulate a second reservoir of the liquid basic hydrogen peroxide stream.

8. The apparatus of claim 1 wherein the flow device includes a gas inlet and a gas outlet on opposing sides of the chemical reaction volume, the gas inlet including a flow distributor to direct the substantially linear flow of the first chemical species in the first direction and the outlet including a transitional nozzle to redirect the substantially linear flow of the first chemical species.

9. The apparatus of claim 1 wherein the substantially linear flow of singlet oxygen is substantially parallel to the flow of the chlorine-bearing gas stream.

10. An apparatus to promote a chemical reaction between a gas of a chlorine-bearing gas stream and a liquid of a liquid basic hydrogen peroxide stream, comprising:
    a flow device to produce a continuous substantially linear flow of the gas, the flow of the gas being directed in a first direction through a gas inlet of a chemical reaction volume to a gas outlet of the chemical reaction volume; and
    an injector to generate a substantially linear flow of droplets of the liquid, the flow of the droplets occurring in a second direction that is substantially perpendicular to the first direction and directed through the chemical reaction volume, whereby the chlorine-bearing gas stream and the liquid basic hydrogen peroxide stream react chemically to produce a substantially linear flow of singlet oxygen.

11. The apparatus of claim 10, wherein the flow of the droplets includes a plurality of substantially simultaneously formed droplets, the plurality of droplets having substantially spherical shapes and having a mean diameter, the standard deviation of the diameters of the plurality of droplets being less than approximately 10 percent of the mean diameter.

12. The apparatus of claim 11 wherein the injector of the plurality of droplets includes a transducer to impart mechanical energy to a first reservoir of the liquid basic hydrogen peroxide stream and a plurality of orifices to form the droplets of the liquid basic hydrogen peroxide stream, whereby the standard deviation of the plurality of droplets of the second species is less than approximately 0.1 percent of the mean diameter of the plurality of droplets.

13. The apparatus of claim 12 wherein the transducer is a piezoelectric transducer.

14. The apparatus of claim 11 wherein the injector includes a collector of the plurality of coexisting droplets, the collector including a plurality of narrow baffles substantially aligned with the second direction.

15. The apparatus of claim 10 wherein the substantially linear flow of singlet oxygen is substantially parallel to the second direction.

16. An apparatus to promote a chemical reaction between a chlorine-bearing gas stream and a liquid basic hydrogen peroxide stream, comprising:
    first means for producing a continuous substantially linear flow of the chlorine-bearing gas stream, the substantially linear flow of the chlorine-bearing gas stream being directed in a first direction through a chemical reaction volume; and
    second means for generating a discrete substantially linear flow of the liquid basic hydrogen peroxide stream, the substantially linear flow of the liquid basic hydrogen peroxide stream occurring in a second direction that is substantially perpendicular to the first direction and directed through the chemical reaction volume, whereby the chlorine-bearing gas stream and the liquid basic hydrogen peroxide stream react chemically to produce a substantially linear flow of singlet oxygen.

17. A method for promoting a chemical reaction between a chlorine-bearing gas stream and a liquid basic hydrogen peroxide stream, the method comprising the steps of:
    a) producing a continuous substantially linear flow of the chlorine-bearing gas stream, the substantially linear flow of the chlorine-bearing gas stream being directed in a first direction through a chemical reaction volume; and
    b) generating a discrete substantially linear flow of the liquid basic hydrogen peroxide stream, the substantially linear flow of the liquid basic hydrogen peroxide stream occurring in a second direction that is substantially perpendicular to the first direction and directed through the chemical reaction volume, whereby the chlorine-bearing gas stream and the liquid basic hydrogen peroxide stream react chemically to produce a substantially linear flow of singlet oxygen.

18. A method for promoting a chemical reaction between a gas of a chlorine-bearing gas stream and a liquid of a liquid basic hydrogen peroxide stream, comprising the steps of:

a) producing a continuous substantially linear flow of the gas, the flow of the gas being directed in a first direction through a gas inlet of a chemical reaction volume to a gas outlet of the chemical reaction volume; and b) generating a substantially linear flow of droplets of the liquid, the flow of the droplets occurring in a second direction that is substantially perpendicular to the first direction and directed through the chemical reaction volume, whereby the chlorine-bearing gas stream and the liquid basic hydrogen peroxide stream react chemically to produce a substantially linear flow of singlet oxygen.

* * * * *